: US 7,773,277 B2
(45) Date of Patent: Aug. 10, 2010

(12) United States Patent
Yamaguchi et al.

(54) BEAM IRRADIATION APPARATUS

(75) Inventors: Atsushi Yamaguchi, Mizuho (JP);
Masato Yamada, Inuyama (JP);
Yoshiaki Maeno, Mizuho (JP)

(73) Assignees: Sanyo Electric Co., Ltd, Osaka (JP);
Sanyo Optec Design Co., Ltd., Tokyo
(JP)

( * ) Notice: Subject to any disclaimer, the term of this
patent is extended or adjusted under 35
U.S.C. 154(b) by 329 days.

(21) Appl. No.: 12/047,038

(22) Filed: Mar. 12, 2008

(65) Prior Publication Data
US 2010/0073750 A1 Mar. 25, 2010

(30) Foreign Application Priority Data
Mar. 13, 2007 (JP) .............................. 2007-062924

(51) Int. Cl.
*G02B 26/08* (2006.01)
(52) U.S. Cl. .............. 359/200.7; 359/199.3; 359/201.1;
359/203.1; 359/209.1; 359/212.1; 250/206.1

(58) Field of Classification Search ....................... None
See application file for complete search history.

(56) References Cited
U.S. PATENT DOCUMENTS
5,777,960 A * 7/1998 Ohno ...................... 369/44.14
FOREIGN PATENT DOCUMENTS
JP 11-083988 A 3/1999
* cited by examiner

*Primary Examiner*—James Phan
(74) *Attorney, Agent, or Firm*—Ditthavong, Mori & Steiner, P.C.

(57) ABSTRACT

A light refracting element formed in parallel plate shape is attached to a support shaft of a mirror holder, a semiconductor laser and a PSD are disposed at positions between which the light refracting element is sandwiched. The light refracting element is rotated by rotation of the mirror holder, and whereby a laser beam irradiation position is changed on a light acceptance surface of PSD. The laser beam irradiation position on a light acceptance surface corresponds to the mirror rotation position, so that the mirror rotation position and a laser beam scanning position in a target area can be detected based on an output from the PSD.

5 Claims, 7 Drawing Sheets

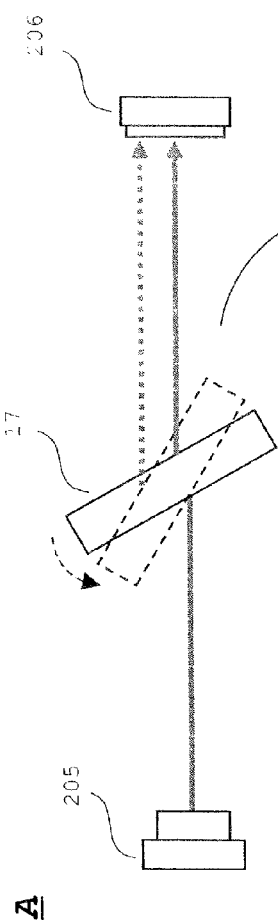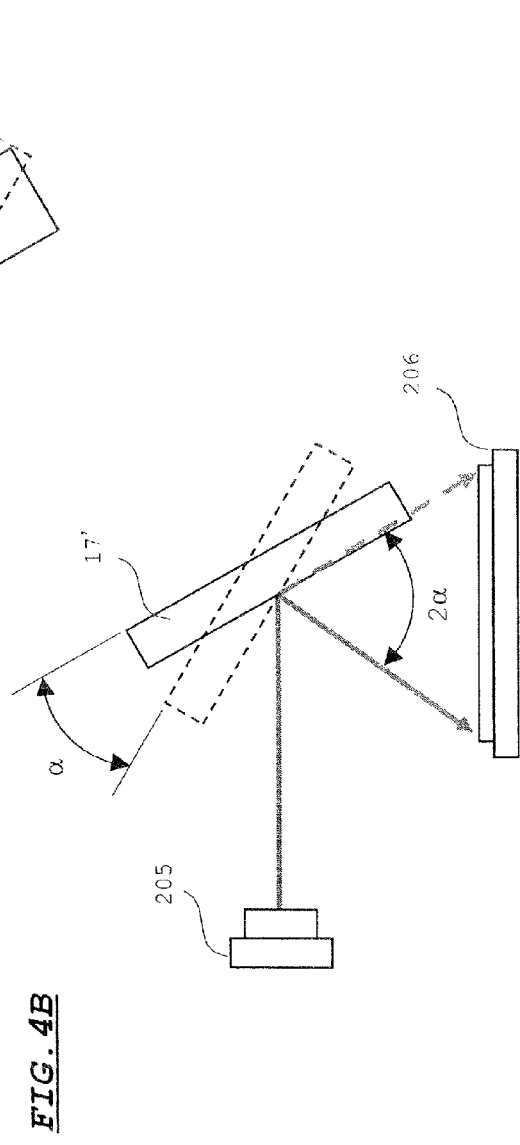
FIG. 4A
FIG. 4B

THE LIGHT REFRACTING ELEMENT 17 IS FORMED IN A SHAPE IN WHICH CONVEX LENS IS CUT OUT SUCH THAT AN OUTLINE BECOMES RECTANGLE WHEN VIEWED FROM LIGHT INCIDENT SIDE

ALTHOUGH THE LIGHT REFRACTING ELEMENT 17 IS FORMED IN A SHAPE CLOSE TO CYLINDRICAL LENS, RIGHT AND LEFT ENDS DIFFER FROM EACH OTHER IN CURVATURE OF LIGHT TRANSMISSION SURFACE

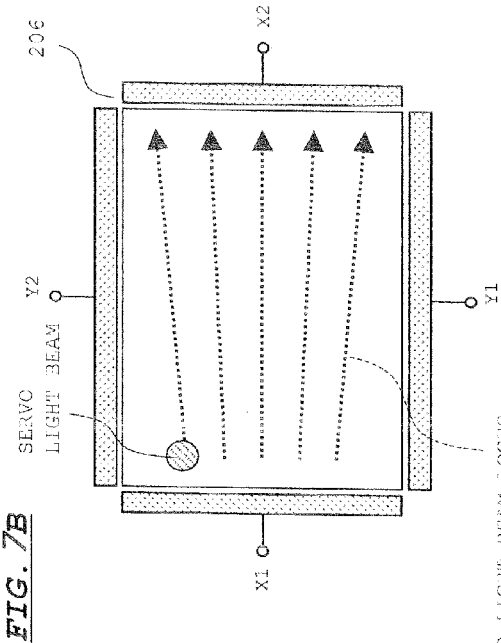
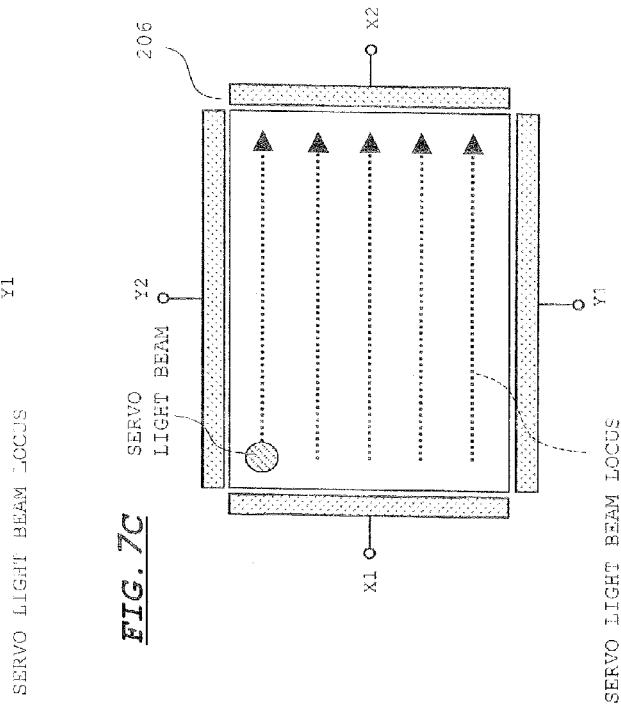
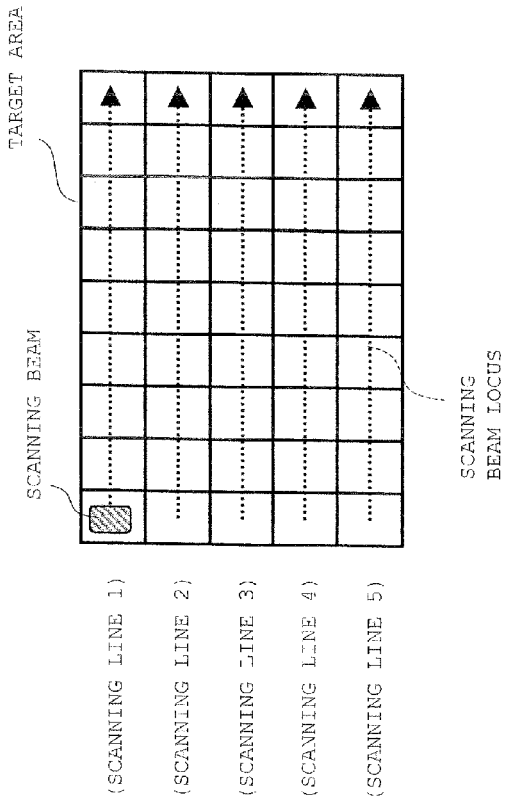
FIG. 7A
FIG. 7B
FIG. 7C

BEAM IRRADIATION APPARATUS

This application claims priority under 35 U.S.C. Section 119 of Japanese Patent Application No. 2007-062924 filed Mar. 13, 2007, entitled "BEAM IRRADIATION APPARATUS".

BACKGROUND OF THE INVENTION

1. Field of the Invention

The present invention relates to a beam irradiation apparatus which irradiates a target area with a laser beam, particularly to a beam irradiation apparatus mounted on so-called laser radar which detects existence of an obstacle within the target area and a distance to the obstacle based on reflected light in irradiating the target area with the laser beam.

2. Description of the Related Art

Recently, a laser radar is mounted on an automobile for family use or the like in order to enhance safety during running. In the laser radar, the front in the running direction is irradiated with a laser beam, and existence of an obstacle in a target area and a distance to the obstacle is detected based on the state of the reflected light. Usually, in the laser radar, the target area is scanned with the laser beam, the existence of the obstacle at each scanning position is detected based on the existence of the light reflected from each scanning position, and the distance to the obstacle at each scanning position is detected based on a necessary time between reflected light acceptance timing and laser beam irradiation timing at the scanning position.

In order to enhance detection accuracy of the laser radar, it is necessary that the target area be properly scanned with the laser beam, and it is necessary that each scanning position of the laser beam be properly detected. A scanning mechanism in which a polygon mirror is used and a lens drive type scanning mechanism in which a scanning lens is two-dimensionally driven have been known as the laser beam scanning mechanism.

In the scanning mechanism in which the polygon mirror is used, a side face of the polygon mirror is irradiated with the laser beam while the polygon mirror is rotated, thereby performing the laser beam scanning. The polygon mirror has a polygon in section, and the mirror is formed in each side face. When the side face of the polygon mirror is irradiated with the laser beam while the polygon mirror is rotated, an incident angle of the laser beam is changed with respect to each side face, and whereby the light beam reflected from the side face is deflected in a polygon mirror rotating direction.

However, in the scanning mechanism, a high-accuracy plane forming technique and application of high-performance motor are necessary because plane accuracy of the mirror surface and a mirror rotating state have a large influence on scanning performance. Additionally, because the mirror surface has a small angle change with respect to a laser beam axis, unfortunately a swing angle of the laser beam is not increased too large.

On the other hand, in the scanning mechanism in which a lens actuator is used, because the scanning is performed by lens drive, the two-dimensional scanning operation can be realized with a relatively simple configuration. However, because the lens is supported by a plate spring or a wire, unfortunately the lens actuator is susceptible to vibration from the outside. When the rigidity of the plate spring or wire is increased to suppress the vibration, a response characteristic is decreased during the scanning operation. Additionally, because the laser beam is incident to an eccentric position with respect to a lens optical axis during the scanning operation, a distortion is generated in an intensity distribution of the laser beam.

The inventor studies a mirror drive type actuator, in which the response characteristic can be enhanced with a simple configuration while the distortion of the laser beam can be suppressed. In the mirror drive type actuator, the mirror is supported in a biaxial drive manner and the mirror is rotated about each drive axis by an electromagnetic drive force between a coil and a magnet. The laser beam is incident to the mirror from an oblique direction, and the mirror is two-dimensionally driven about each drive axis. Therefore, the target area is two-dimensionally scanned with laser beam reflected from the mirror.

SUMMARY OF THE INVENTION

The present invention relates to a biaxial drive type beam irradiation apparatus. According to the present invention, the beam irradiation position in a target area can smoothly be detected with a simple configuration. Particularly, a compact configuration for detecting the beam irradiation position is achieved at low cost, so that the beam irradiation apparatus can be achieved at low cost as a whole.

In accordance with an aspect of the present invention, a beam irradiation apparatus includes a mirror; a mirror holder which holds the mirror; a first retaining member in which the mirror holder is journaled while being rotatable in a first direction; a second retaining member in which the first retaining member is journaled while being rotatable in a second direction perpendicular to the first direction; an electromagnetic driving unit which drives the first and second retaining bodies in the first and second directions respectively; a light refracting element which is integrally provided in the mirror holder; a servo light source which irradiates the light refracting element with servo light; and a photodetector which accepts the servo light refracted by the light refracting element and outputs a signal according to a light acceptance position.

According to the aspect of the present invention, the servo light beam is swung by using the refracting action of the light refracting element, so that the swing width of the servo light beam can be decreased on the photodetector. Therefore, the light acceptance surface of the photodetector can be decreased, and the compact configuration for detecting the beam irradiation position can be achieved at low cost.

In the beam irradiation apparatus according to the aspect of the present invention, preferably the light refracting element is a plate-like translucent member. For example, the light refracting element can be formed by a parallel plate made of glass, polycarbonate, or an acrylic material. Therefore, the light refracting element becomes cost-effective because the light refracting element has an inexpensive and simple shape. Particularly, the light refracting element made of light-weight and high-refractive-index polycarbonate can achieve the low profile, light weight, and enhanced response characteristic of the mirror.

In the beam irradiation apparatus according to the aspect of the present invention, preferably the light refracting element is a lens-shaped translucent member. At this point, for example, the lens shape can be formed such that the light acceptance surface of the photodetector is smoothly scanned with the servo light beam according to the drive of the mirror. For example, the lens shape can be formed such that the overall light acceptance surface of the photodetector is scanned with the servo light beam according to the swing width of the mirror. In this case, the light acceptance surface is effectively used to enhance accuracy of servo light beam position detection.

In the beam irradiation apparatus according to the aspect of the present invention, preferably the light refracting element is attached to a rotating shaft of the mirror holder.

In the beam irradiation apparatus according to the aspect of the present invention, preferably the electromagnetic driving unit includes first and second coils which are provided in the mirror holder and the first retaining member respectively; and first and second magnets which are disposed in the second retaining member so as to face the first and second coils. Thus, when the coils are provided in the mirror holder and first retaining member which are located on the movable side, the weight reduction is achieved in a movable unit, so that the response characteristic of the mirror can be enhanced.

BRIEF DESCRIPTION OF THE DRAWINGS

The above and further objects and novel features of the present invention will more fully appear from the following description when the same is read with reference to the accompanying drawings:

FIGS. 4A and 4B show actions of a light refracting element according to an embodiment of the present invention;

FIGS. 7A, 7B, and 7C are views explaining a shape setting method when the light refracting element according to the embodiment of the present invention is formed in a curved surface shape (lens shape).

Figure 1:
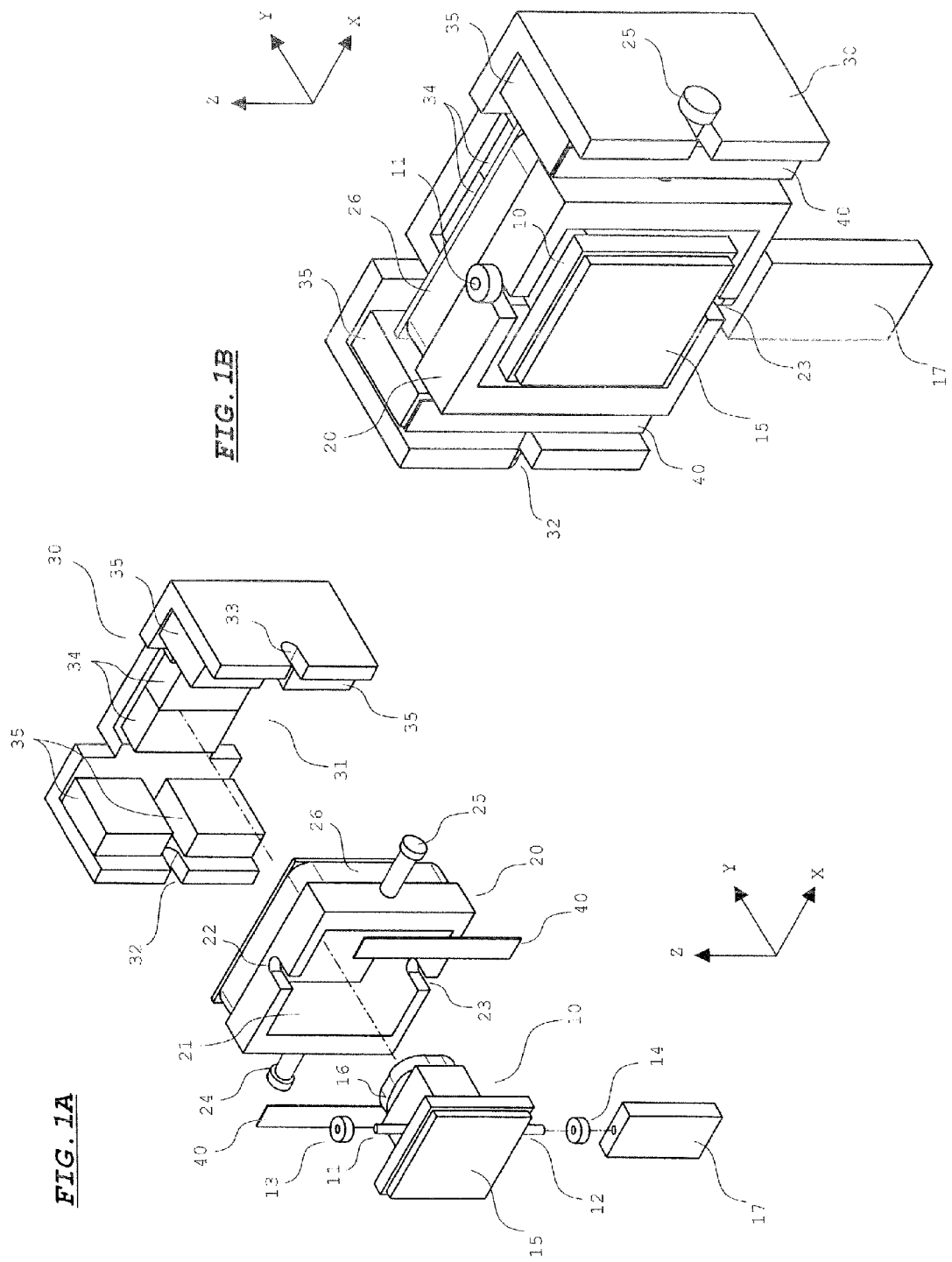
FIGS. 1A and 1B show a configuration of an actuator according to an embodiment of the present invention.

However, it is to be expressly understood that the drawing is for purpose of illustration only and is not intended as a definition of the limits of the present invention.

DESCRIPTION OF PREFERRED EMBODIMENTS

FIG. 1 shows a configuration of a beam irradiating actuator according to an embodiment of the present invention. FIG. 1A is an exploded perspective view of the actuator and FIG. 1B is a perspective view showing the actuator in an assembled state.

Referring to FIG. 1A, support shafts 11 and 12 are formed in a mirror holder 10, and bearings 13 and 14 are attached in end portions of the support shafts 11 and 12. The support shaft 12 is inserted and attached in the bearing 14 while the end portion of the bearing 14 is projected. A mirror 15 is attached to a front surface of the mirror holder 10, and a coil 16 is attached to the backside of the mirror holder 10. The coil 16 is wounded in a rectangular shape. A parallel plate light refracting element 17 is attached to the end portion of the support shaft 12 of the mirror holder 10. The light refracting element 17 is made of a translucent material.

The mirror holder 10 is journaled in a movable frame (first retaining member) 20 while being rotatable in an XY-plane direction. An opening 21 is formed in the movable frame 20 to accommodate the mirror holder 10, and grooves 22 and 23 are formed in the movable frame 20 to accommodate the support shafts 11 and 12 of the mirror holder 10. Support shafts 24 and 25 are formed in side faces of the movable frame 20, and the support shafts 24 and 25 have retaining portions in end portions thereof. A coil 26 is attached in the backside of the movable frame 20. The coil 26 is wounded in a rectangular shape.

The movable frame 20 is journaled in a fixed frame (second retaining member) 30 while being rotatable in a YZ-plane direction. A recess 31 is formed in the fixed frame 30 to accommodate the movable frame 20, and grooves 32 and 33 are also formed in the fixed frame 30 to engage the support shafts 24 and 25 of the movable frame 20. A magnet 34 and a magnet 35 are attached to inner surfaces of the fixed frame 30, the magnet 34 applies a magnetic field to the coil 15 and the magnet 35 applies a magnetic field to the coil 26. The grooves 32 and 33 are extended into a gap between the two vertically-placed magnets 35 from the front surface of the fixed frame 30.

Pressing plates 40 press the support shafts 24 and 25 from the front side for preventing the support shafts 24 and 25 of the movable frame 20 from dropping out from the grooves 32 and 33.

In assembling the actuator, after the support shaft 12 is inserted in and attached to the bearing 14, the light refracting element 17 is attached to an end portion of the support shaft 12. At this point, the support shafts 11 and 12 of the mirror holder 10 are accommodated in the grooves 22 and 23 of the movable frame 20. Then, the bearings 13 and 14 are fixed to the upper and lower surfaces of the movable frame 20 while the bearing 13 is attached to the end portion of the support shaft 11. Therefore, the mirror holder 10 is supported in the movable frame 20 while being rotatable in the XY-plane direction. The bearings 13 and 14 regulate rattling of the mirror holder 10 in an axial direction of the support shafts 11 and 12 while the support shafts 11 and 12 are journaled in the bearings 13 and 14.

After the mirror holder 10 is attached to the movable frame 20, the support shafts 24 and 25 of the movable frame 20 are engaged in the grooves 32 and 33 of the fixed frame 30, and the pressing plates 40 are attached to the front face of the magnets 35 while the support shafts 24 and 25 are pressed. Thus, the movable frame 20 is attached to the fixed frame 30 while being rotatable in the YZ-plane direction, and the assembly of the actuator is completed.

When the mirror holder 10 is rotated in the XY-plane direction with respect to the movable frame 20, the mirror 15 and the light refracting element 17 are rotated. When the movable frame 20 is rotated in the YZ-plane direction with respect to the fixed frame 30, the mirror holder 10 is rotated, and therefore the mirror 15 and the light refracting element 17 are integrally rotated with the mirror holder 10. Thus, the mirror holder 10 is supported in the two-dimensionally rotatable manner by the support shafts 11 and 12 and the support shafts 24 and 25 which are orthogonal to each other.

In the assembled state of FIG. 1B, when the coil 16 is divided into two parts in an X-axis direction, the two magnets 34 face the two divided parts of the coil 16 respectively. Polarities of the two magnets 34 are adjusted such that opposite electromagnetic drive forces are generated in parallel with a Y-axis direction in the two divided parts of the coil 16 when a current is passed through the coil 16. Therefore, when a predetermined current is passed through the coil 16, the mirror holder 10 is rotated in the XY-plane direction about the support shafts 11 and 12 by the electromagnetic drive forces generated in the coil 16.

In the assembled state of FIG. 15, two vertically-divided parts of the magnet 35 face two parts into which one side of the coil 26 parallel to a Z-axis direction is divided in the Z-axis direction, respectively. The polarities of the two magnets 35 are adjusted such that the opposite electromagnetic drive forces are generated in parallel with the Y-axis direction in the two divided parts of the coil 26 when a current is passed through the coil 26. Therefore, when the current is passed through the coil 26, the movable frame 20 is rotated in the YZ-plane direction about the support shafts 24 and 25 by the electromagnetic drive forces generated in the coil 26.

Thus, the mirror holder 10 and the movable frame 20 are rotated in the XY-plane direction and the YZ-plane direction by passing the currents through the coil 16 and the coil 26 respectively. Therefore, the mirror 15 and the light refracting element 17 are rotated in the XY-plane direction and the YZ-plane direction while being integral, with the mirror holder 10.

Figure 2:
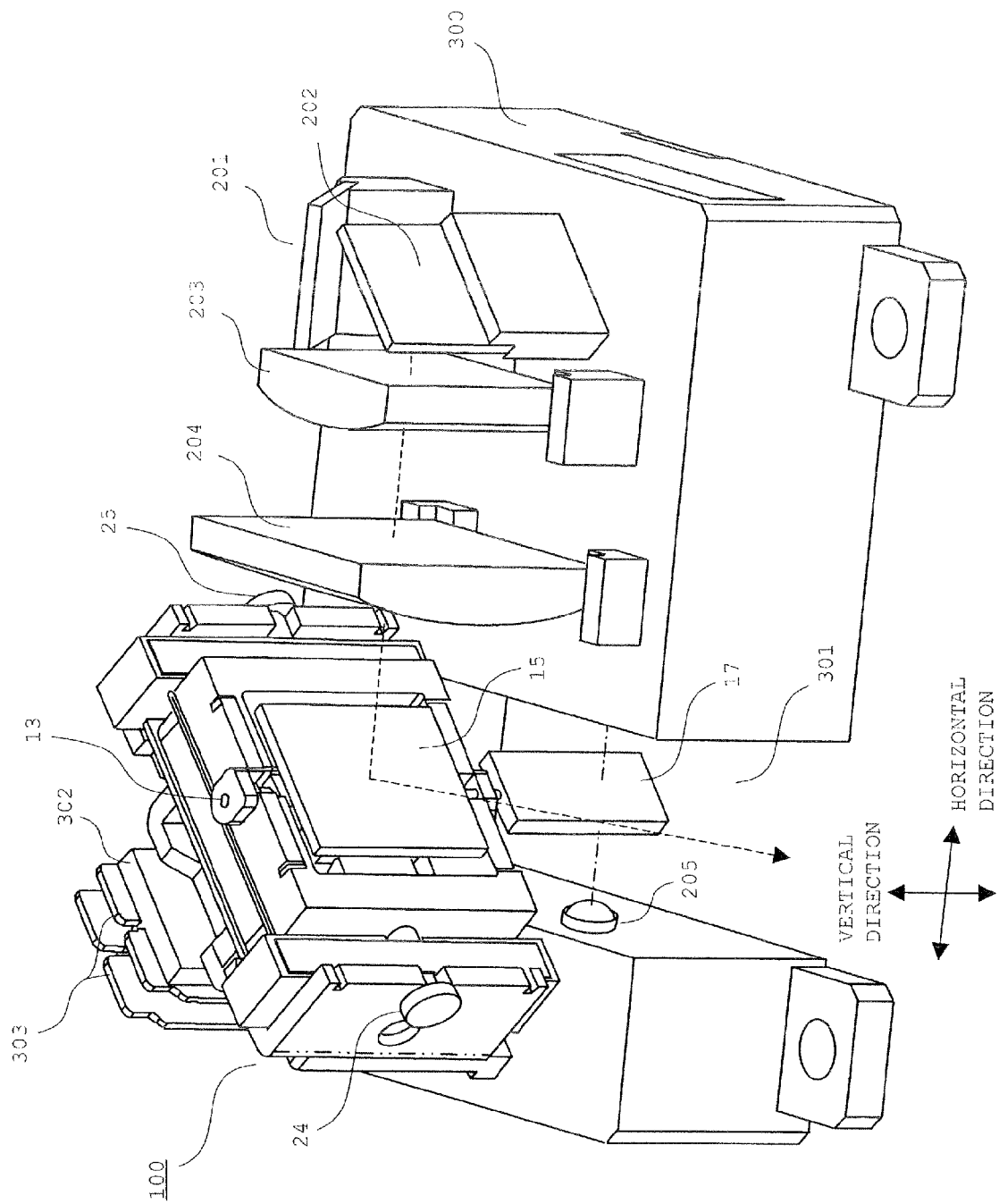
FIG. 2 shows a configuration of a beam irradiation apparatus according to an embodiment of the present invention.

FIG. 2 shows a configuration of an optical system on which an actuator 100 is mounted. In the actuator 100 of FIG. 2, the basic configuration is similar to that of the actuator of FIG. 1, although details are slightly changed in a shape of the fixed frame 35 and the like when compared with that of FIG. 1.

Referring to FIG. 2, a base 300 supports the optical system. A recess 301 is formed in the base 300, and the actuator 100 is mounted on the base 300 while the light refracting element 17 is accommodated in the recess 301.

Mirrors 201 and 202 and beam shaping lenses 203 and 204 are mounted on an upper surface of the base 300. In the base 300, a laser beam source (not shown) is mounted at a position facing the mirror 201. Further, in the base 300, a wall portion 302 is formed at the back of the actuator 100, and a circuit board 303 is mounted in the wall portion 302. The coils 16 and 26 of the actuator 100 are connected to the circuit board 303 through a lead wire through which a servo signal is supplied from the circuit board 303 to the coils 16 and 26.

The laser beam emitted upward from the laser beam source (not shown) is horizontally reflected by the mirror 201 and further horizontally folded by 90 degrees by the mirror 202. Then, the laser beam is subject to horizontal convergent action and vertical convergent action from the lenses 203 and 204. In the lenses 203 and 204, a lens surface is designed such that a beam shape has a predetermined size (for example, about 2 m long and about 1 m wide) in a target area (for example, set at a position of about 100 m in front of a beam outgoing port).

The laser beam passed through the lenses 203 and 204 is incident to the mirror 15 of the actuator 100 and reflected toward the target area by the mirror 15. The actuator 100 two-dimensionally drives the mirror 15 to two-dimensionally scan the target area with the laser beam.

The actuator 100 is disposed such that the laser beam from the lens 204 is incident to the mirror 15 with an incident angle of 45 degrees in the horizontal direction relative to a mirror surface of the mirror 15 when the mirror 15 is located at a neutral position. The light refracting element 17 is attached to the support shaft 12 of the mirror holder 10 such that a plate surface of the light refracting element 17 is parallel to a reflection surface of the mirror 15. As used herein, the term "neutral position" shall mean a position of the mirror 15 when the laser beam is incident to the mirror surface with the incident angle of 45 degrees in the horizontal direction relative to the mirror surface while the mirror surface is parallel to the vertical direction.

In inside surfaces of the recess 301, a semiconductor laser 205 and a PSD (Position Sensing Device) 206 (not shown in FIG. 2) are provided at a position where the light refracting element 17 is sandwiched in the horizontal direction. The semiconductor laser 205 emits the laser beam in the horizontal direction, and is disposed such that the laser beam is incident to a flat surface of the light refracting element 17 with the angle of 45 degrees in the horizontal direction when the mirror 15 is located at the neutral position. The PSD 206 is disposed such that a center position of a light acceptance surface is irradiated with the laser beam transmitted through the light refracting element 17 when the mirror 15 is located at the neutral position.

Figure 3B:
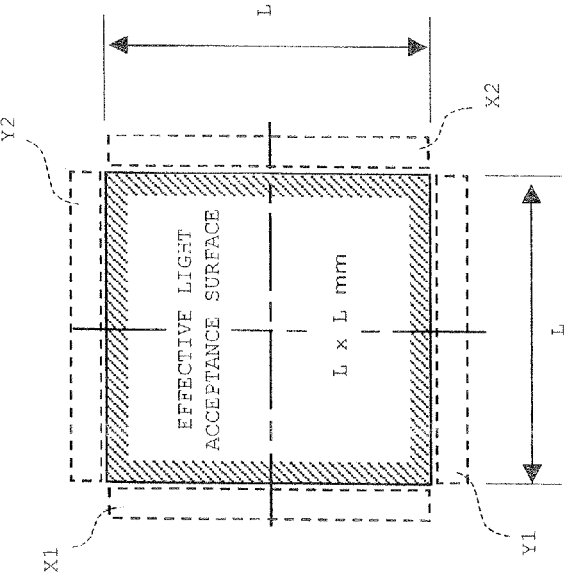
FIGS. 3A and 3B show a configuration of PSD according to an embodiment of the present invention.
Figure 3A:
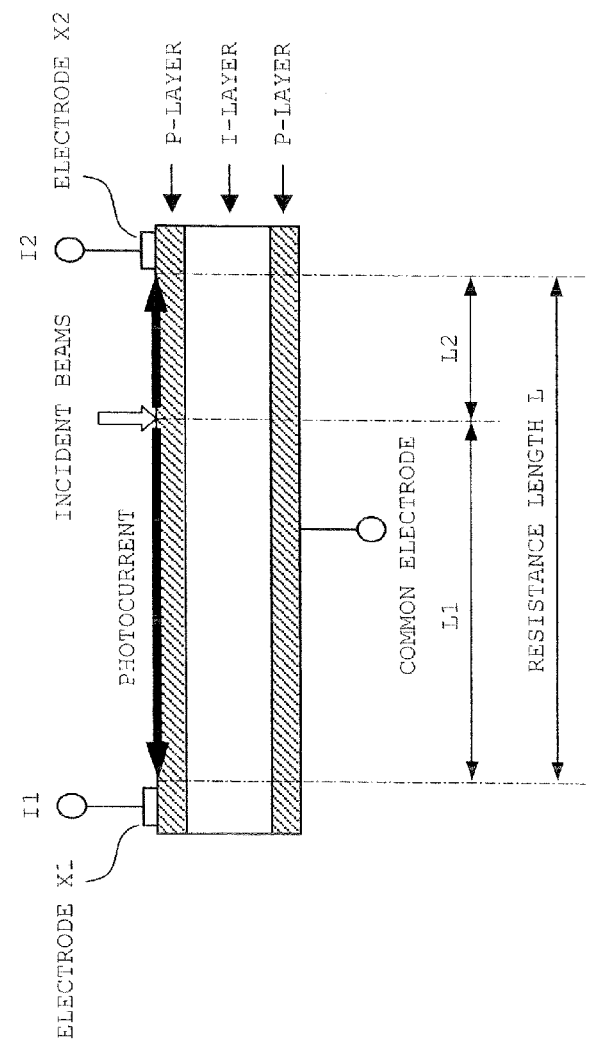

FIG. 3A is a view (side sectional view) showing a configuration of the PSD 206, and FIG. 3B is a view showing the light acceptance surface of the PSD 206.

Referring to FIG. 3A, the PSD 206 has a structure in which a P-type resistance layer functioning as both the light acceptance surface and the resistance layer is formed in a surface of an N-type high-resistance silicon substrate. Electrodes X1 and X2 for outputting a photocurrent in a horizontal direction of FIG. 3B and electrodes Y1 and Y2 (not shown in FIG. 3A) for outputting a photocurrent in a vertical direction are formed in the surface of the resistance layer. A common electrode is formed in the backside of the resistance layer.

When the light acceptance surface is irradiated with the laser beam, charges are generated at irradiation position in proportion to a light quantity. The charges in the form of the photocurrent reach the resistance layer, and the charges are outputted from the electrodes X1, X2, Y1, and Y2 while divided in inverse proportion to a distance to each electrode. Each of the currents outputted from the electrodes X1, X2, Y1, and Y2 has magnitude divided in inverse proportion to the distance to each electrode. Therefore, the position irradiated with the light can be detected on the light acceptance surface based on the currents outputted from the electrodes X1, X2, Y1, and Y2.

The laser beam emitted from the semiconductor laser 205 is refracted by the light refracting element 17 and reaches the PSD 206. At this point, the position on the PSD 206 irradiated with the laser beam is changed according to an inclination state of the light refracting element 17. On the other hand, because the light refracting element 17 is rotated while being integral with the mirror 15, the position at which the mirror 15 is rotated corresponds to the position at which the light refracting element 17 is rotated one by one. Accordingly, the position on the light acceptance surface of PSD 206 irradiated with the laser beam transmitted through the light refracting element 17 corresponds to the position at which the mirror 15 is rotated. Therefore, based on the position on the light acceptance surface of PSD 206 irradiated with the laser beam, the position at which the mirror 15 is rotated can be detected and the beam scanning position in the target area can be detected.

Action of the light refracting element 17 will be described with reference to FIGS. 4A and 4B. FIG. 4A shows a configuration of a servo system including the light refracting element 17, the semiconductor laser 205, and the PSD 206 when viewed from an upper surface side of FIG. 2.

When the mirror 15 is located at the neutral position, the light refracting element 17 is located at a position indicated by a solid line. At this point, the laser beam emitted from the semiconductor laser 205 is incident to the incident surface of the light refracting element 17 with the incident angle of 45 degrees in the horizontal direction. The laser beam incident to the light refracting element 17 is refracted as shown by the solid line in the lower stage of FIG. 4A by the incident surface of the light refracting element 17. The laser beam is transmitted through the light refracting element 17 after refracted, and the laser beam is refracted again as shown by the solid line in the lower stage of FIG. 4A by the outgoing surface of the light refracting element 17. Then, the laser beam is incident to PSD 206 through an optical path shown by the solid line.

The light refracting element 17 is rotated when the mirror 15 is rotated counterclockwise by a predetermined angle from the neutral position in the horizontal direction. When the rotation locates the light refracting element 17 at the position shown by a broken line of FIG. 4A, the laser beam incident to the light refracting element 17 is refracted as shown by the broken line in the lower stage of FIG. 4A by the incident surface of the light refracting element 17. The laser beam is transmitted through the light refracting element 17 after refracted, and the laser beam is refracted again as shown by the broken line in the lower stage of FIG. 4A by the outgoing surface of the light refracting element 17. Then, the laser beam is incident to the PSD 206 through an optical path shown by the broken line.

Thus, when the light refracting element 17 is rotated by the rotation of the mirror 15, the laser beam incident position is changed on the PSD 206 by the refracting action of the light refracting element 17. However, even if the light refracting element 17 is rotated, the laser beam traveling direction is not changed after the laser beam is transmitted through the light refracting element 17. That is, an optical axis of the laser beam incident to the PSD 206 becomes parallel before and after the light refracting element 17 is rotated.

Figure 5:
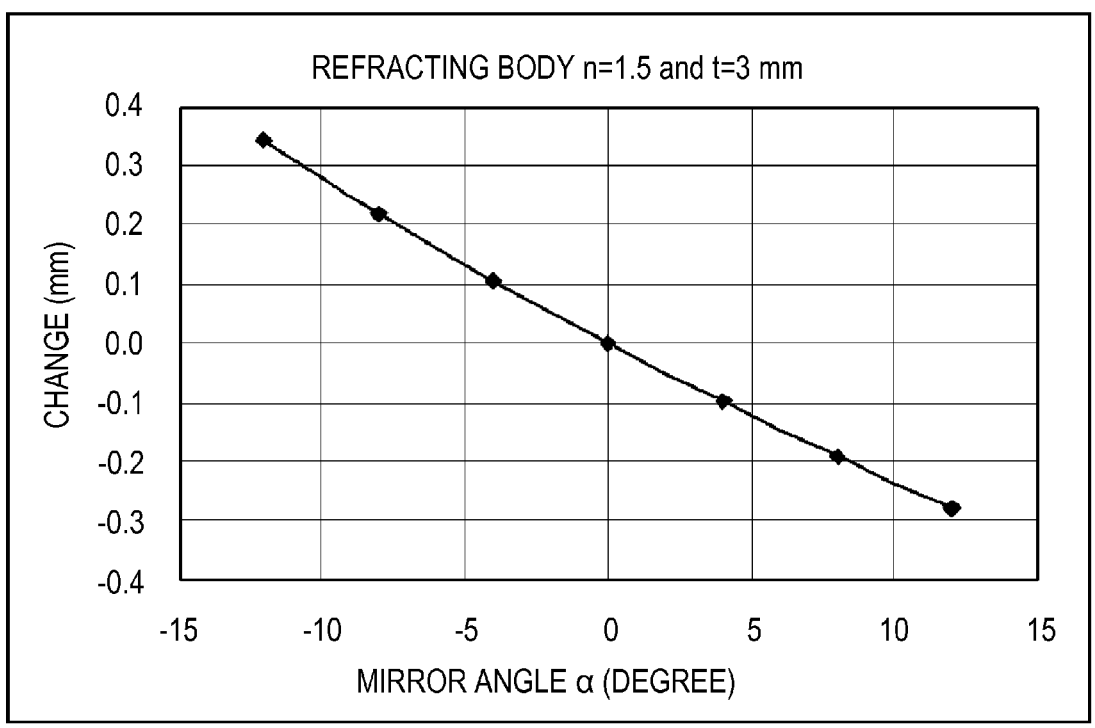
FIG. 5 shows a characteristic of the actuator according to the embodiment of the present invention.

FIG. 5 shows a simulation of a relationship between the rotation angle of the mirror 15 and the change in laser beam incident position on the PSD 206 when the mirror 15 is horizontally rotated. In FIG. 5, a horizontal axis indicates the rotation angle of the mirror 15 with respect to the neutral position and a vertical axis indicates the change in laser beam incident position with respect to the center position in the light acceptance surface of PSD 206. In the rotation angle of the mirror 15, clockwise rotation of FIG. 2A has a positive sign. In the change in laser beam incident position, the upward change of FIG. 2A has a positive sign. In the simulation, a refractive index n of the light refracting element 17 is set to 1.5 and a thickness t of the light refracting element 17 is set to 3 mm.

As shown in FIG. 5, in the simulation, when the mirror 15 is horizontally rotated in a range of ±15 degrees with respect to the neutral position, the laser beam incident position in the light acceptance surface of PSD 206 is horizontally changed within a range of about ±0.4 mm. The same result as the simulation is obtained when the mirror 15 is vertically rotated with respect to the neutral position.

When a swing angle of the mirror 15 is set to about ±12 degrees with respect to the neutral position, a swing angle of the laser beam becomes about 45 degrees, so that the actual scanning range can sufficiently be ensured.

Accordingly, in the case where the beam irradiation apparatus of the embodiment is mounted on the in-vehicle laser radar, it is necessary to form a servo system on the assumption that the mirror 15 swings horizontally within the range of about ±12 degrees with respect to the neutral position. That is, it is necessary that the size of the light acceptance surface of PSD 206 be set so as to be able to correspond to the range of the change in laser beam when the light refracting element 17 is horizontally rotated within the range of about ±12 degrees with respect to the neutral position.

As a result of the simulation of FIG. 5, the light acceptance surface of PSD 206 can have the size corresponding to the change in laser beam of about ±0.4 mm because the horizontal change in laser beam is in the range of ±0.4 mm. Because actually the laser spot has the spread to an extent on the light acceptance surface of PSD 206, it is necessary to form the light acceptance surface of PSD 206 wider than the range of the change in laser beam in order that the PSD 206 properly detect the position. Similarly to the simulation condition of FIG. 5, assuming that the refractive index n and thickness t of the light refracting element 17 are set to 1.5 and 3 mm respectively, the light acceptance surface of PSD 206 can be set to the size of 2 mm by 2 mm in consideration of the spread of the laser spot.

FIG. 4B shows a configuration of a comparative example. In the comparative example of FIG. 4B, a mirror 17' is replaced for the light refracting element 17. In this case, the laser beam reflected by the mirror 17' swings with the rotation angle double a rotation angle α of the mirror 17', it is necessary that the light acceptance surface of PSD 206 be set considerably large when the PSD 206 accepts the laser beam.

On the other hand, in the embodiment, because the laser beam is changed by the refracting action of the light refracting element 17, the change in laser beam irradiation position can be set in the considerably-small range on the light acceptance surface of PSD 206 as described above with reference to FIG. 4A. Accordingly, in the embodiment, the light acceptance surface of PSD 206 can significantly be decreased compared with the comparative example, and the miniaturization of the servo optical system and the cost reduction can be achieved.

In the embodiment, because the light refracting element 17 is attached to the support shaft 12 of the mirror holder 10 which is of the movable unit, desirably the light refracting element 17 is formed as light as possible in consideration of the response performance of the mirror 15. The weight reduction of the light refracting element 17 can be realized by use of a material having small specific gravity. Because a lower profile of the light refracting element 17 can be achieved with increasing refractive index, the weight reduction of the light refracting element 17 can be realized by use of a material having the high refractive index.

Examples of the typical material include polycarbonate, acrylic materials, vinyl chloride, and inorganic glass. The refractive index and specific gravity of these materials are shown as follows.

|  | polycarbonate | acrylic materials | vinyl chloride | inorganic glass |
| --- | --- | --- | --- | --- |
| Refractive index | 1.59 | 1.48-1.50 | 1.52-1.55 | 1.52 |
| Specific gravity | 1.2 | 1.17-1.20 | 1.30-2.30 | 2.50 |

Polycarbonate is superior to other material in the refractive index and the specific gravity. Therefore, preferably the light refracting element 17 is made of polycarbonate.

The present invention is not limited to the embodiment, but various modifications can be made in addition to the embodiment.

Figure 6A:
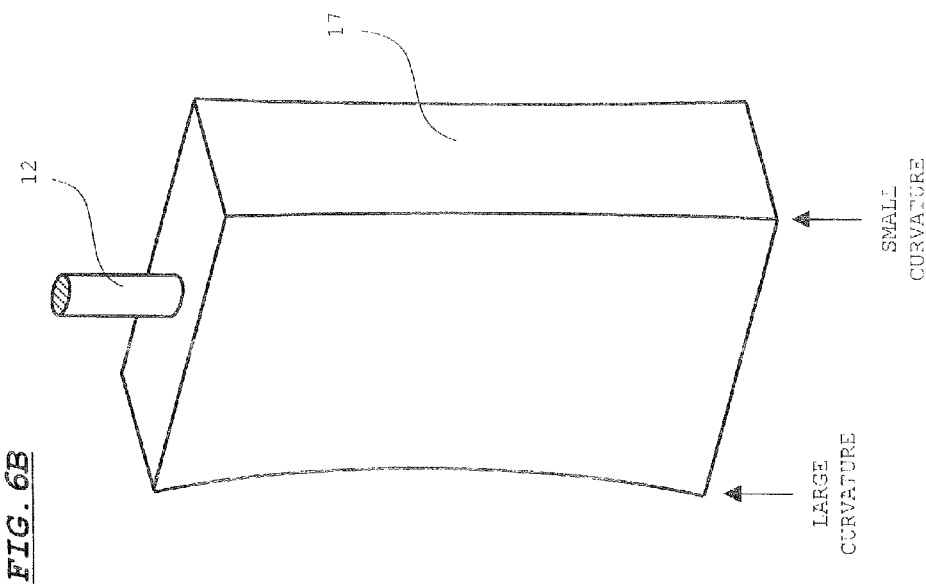
FIGS. 6A and 6B show a modification of the light refracting element according to the embodiment of the present invention.

For example, although the light refracting element 17 is formed in the parallel plate shape in the embodiment, the light refracting element 17 may be formed in another shape. When the light refracting element 17 is formed in a lens shape (see FIG. 6A) so as to cause the laser beam to converge, the spread of the laser spot is suppressed on the light acceptance surface, so that the size of the light acceptance surface can further be decreased. In FIG. 6A, the light refracting element 17 is formed in a shape in which convex lens is cut out such that an outline becomes rectangle when viewed from light incident side.

Figure 6B:
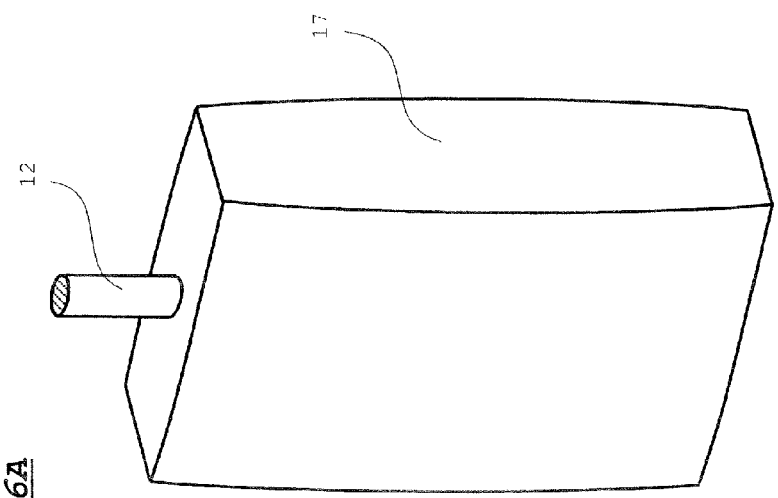

The light refracting element 17 may be formed in a shape (see FIG. 6B) in which the overall light acceptance surface is scanned with the servo laser beam according to the swing width of the mirror 15. In FIG. 6B, although the light refracting element 17 is formed in a shape close to cylindrical lens, right and left ends differ from each other in curvature of light transmission surface. Usually the target area is scanned with the laser beam (scanning beam) as shown in FIG. 7A. At this point, when the configuration of FIG. 2 is used, the light acceptance surface of PSD 206 is not horizontally scanned with the laser beam (servo light), but scanned as shown in FIG. 7B. Therefore, the light refracting element 17 is formed in a curved surface shape (a lens shape as shown in FIG. 6B, for example) such that the light acceptance surface of PSD 206 is horizontally scanned with the servo light as shown in FIG. 7C. This enables the light acceptance surface to be effectively used to enhance the accuracy of servo laser beam position detection.

Furthermore, in the embodiment of the present invention, various changes can appropriately be made without departing from the scope of the technical thought disclosed claims of the invention.

What is claimed is:

1. A beam irradiation apparatus comprising:
   a mirror;
   a mirror holder which holds the mirror;
   a first retaining member in which the mirror holder is journaled while being rotatable in a first direction;
   a second retaining member in which the first retaining member is journaled while being rotatable in a second direction perpendicular to the first direction;
   an electromagnetic driving unit which drives the first and second retaining members in the first and second directions respectively;
   a light refracting element which is integrally provided in the mirror holder;
   a servo light source which irradiates the light refracting element with servo light; and
   a photodetector which accepts the servo light refracted by the light refracting element and outputs a signal according to a light acceptance position.

2. The beam irradiation apparatus according to claim 1, wherein the light refracting element is a plate-like translucent member.

3. The beam irradiation apparatus according to claim 1, wherein the light refracting element is a lens-shaped translucent member.

4. The beam irradiation apparatus according to claim 1, wherein the light refracting element is attached to a rotating shaft of the mirror holder.

5. The beam irradiation apparatus according to claim 1, wherein the electromagnetic driving unit includes:
   first and second coils which are provided in the mirror holder and the first retaining member respectively; and
   first and second magnets which are disposed in the second retaining member so as to face the first and second coils.

* * * * *